Jan. 7, 1936.  E. J. VON PEIN  2,027,077
SCALE
Filed Jan. 5, 1931  12 Sheets-Sheet 1

Jan. 7, 1936. E. J. VON PEIN 2,027,077
SCALE
Filed Jan. 5, 1931 12 Sheets-Sheet 2

Jan. 7, 1936.  E. J. VON PEIN  2,027,077
SCALE
Filed Jan. 5, 1931  12 Sheets-Sheet 3

INVENTOR
E. J. Von Pein
BY ATTORNEY
W. M. Wilson

Jan. 7, 1936.　　　　E. J. VON PEIN　　　2,027,077
SCALE
Filed Jan. 5, 1931　　12 Sheets-Sheet 4

INVENTOR
E. J. Von Pein
BY ATTORNEY

Jan. 7, 1936. E. J. VON PEIN 2,027,077
SCALE
Filed Jan. 5, 1931 12 Sheets-Sheet 6

INVENTOR
BY ATTORNEY

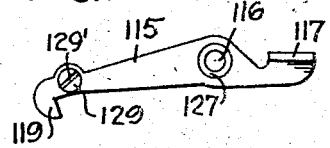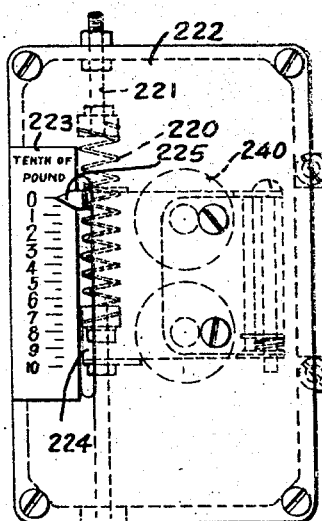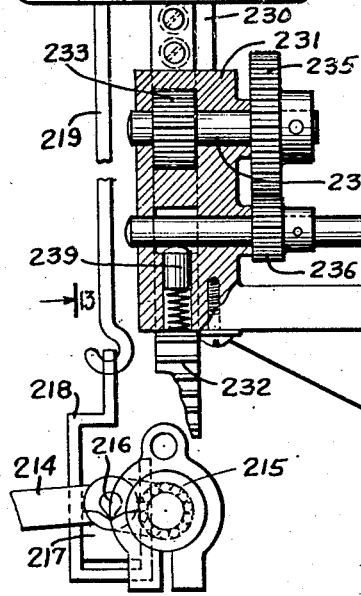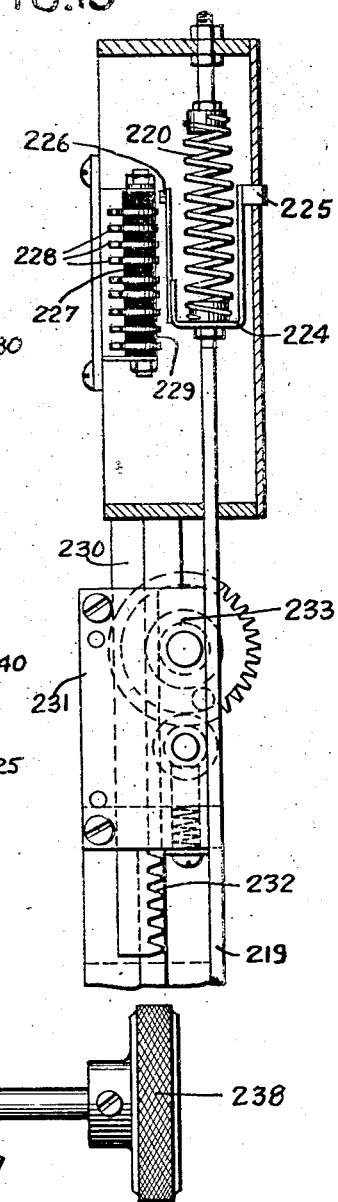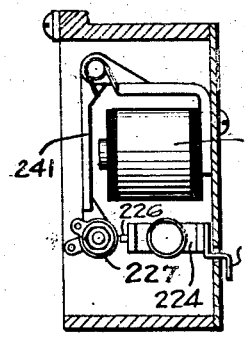

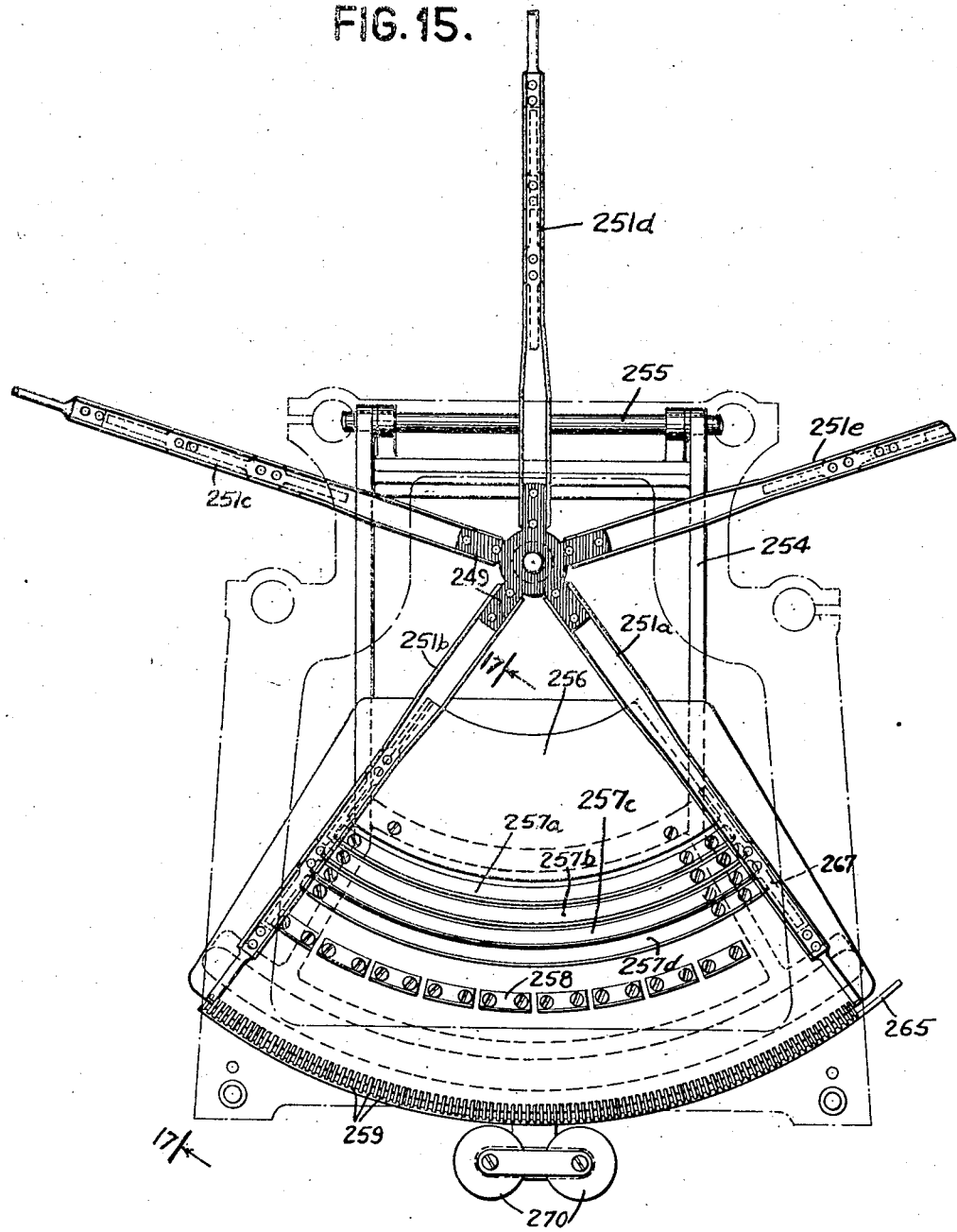

Jan. 7, 1936. E. J. VON PEIN 2,027,077
SCALE
Filed Jan. 5, 1931 12 Sheets-Sheet 9

INVENTOR
E. J. Von Pein
BY ATTORNEY
W. M. Wilson

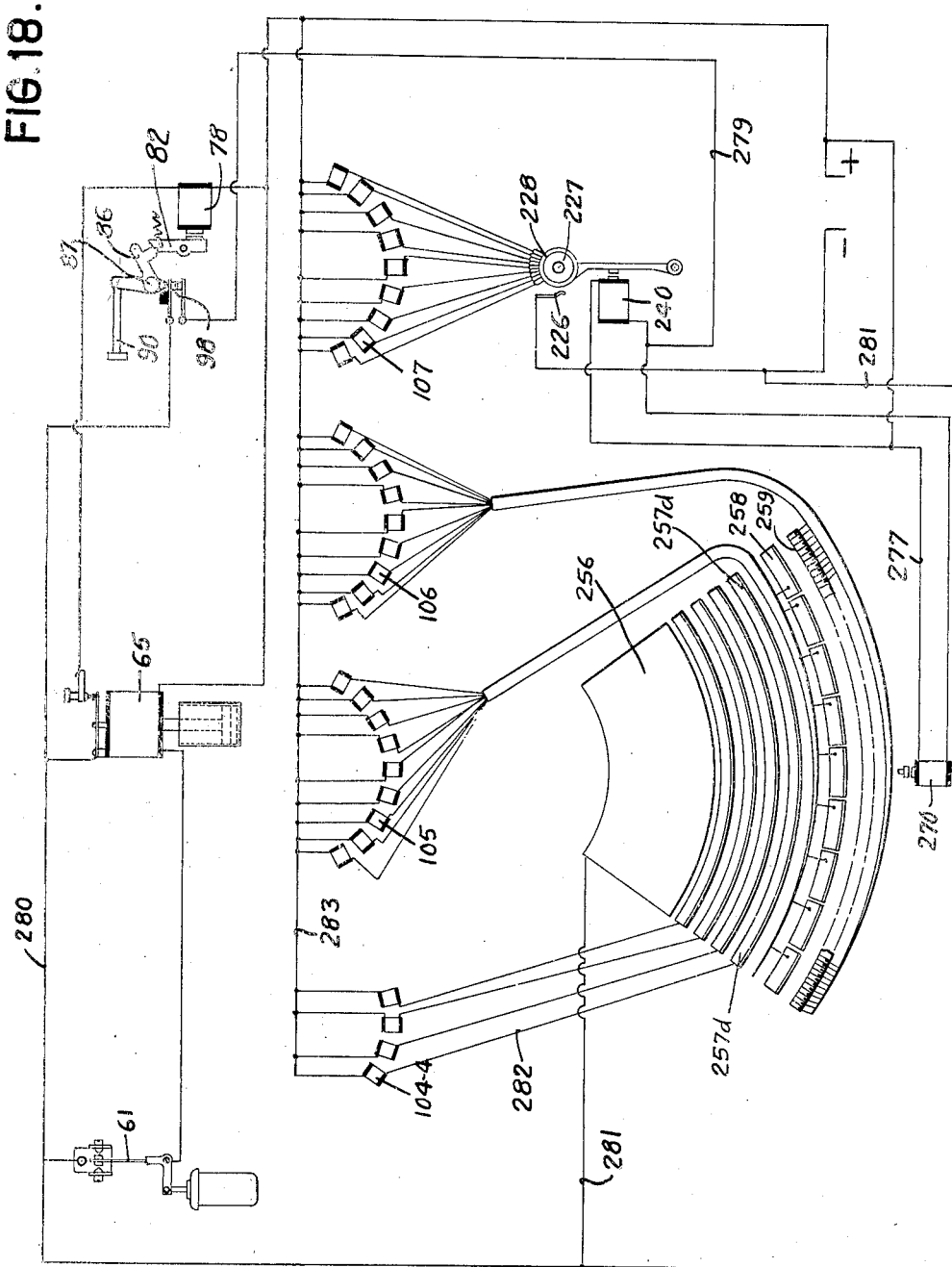

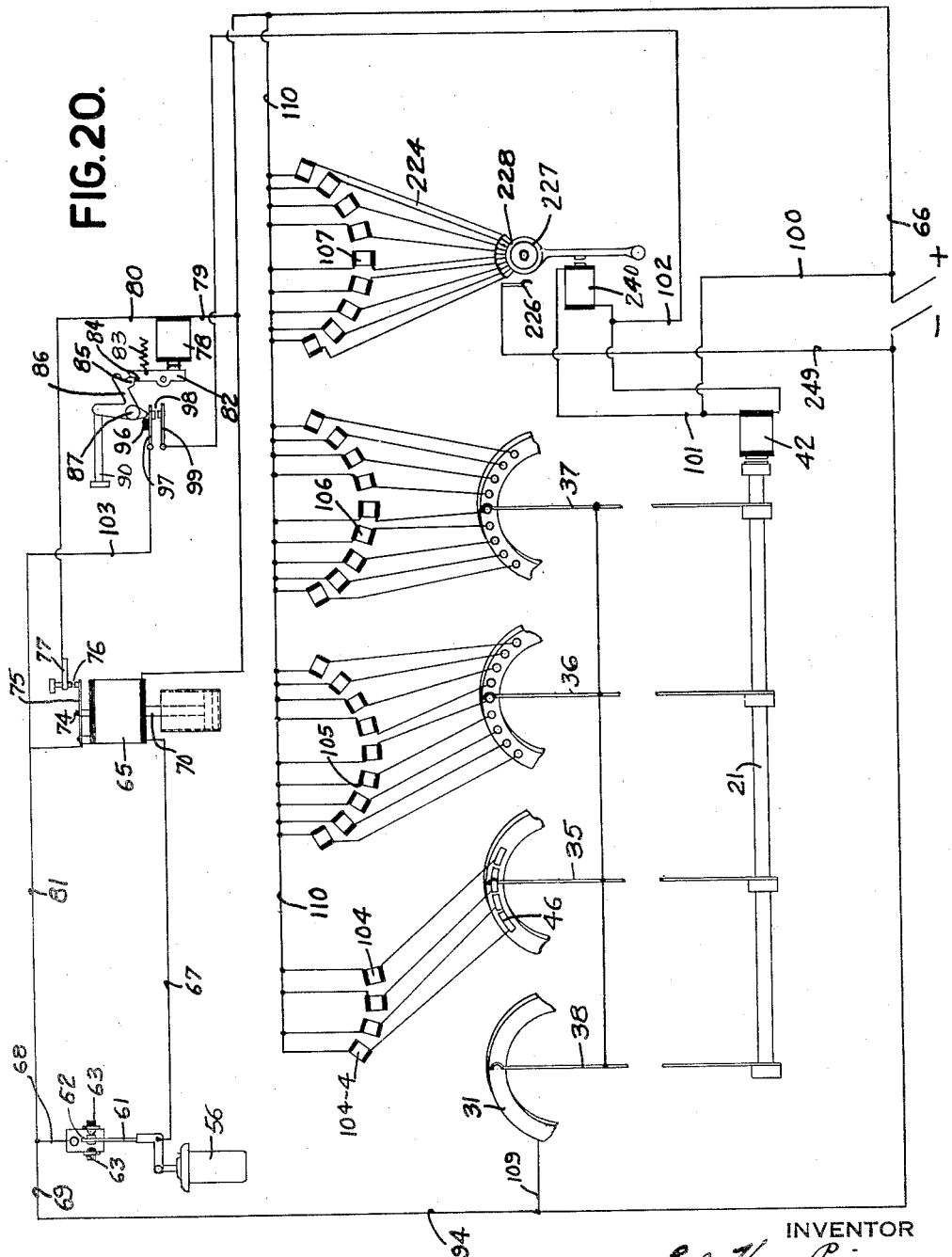

Jan. 7, 1936.  E. J. VON PEIN  2,027,077
SCALE
Filed Jan. 5, 1931   12 Sheets-Sheet 12
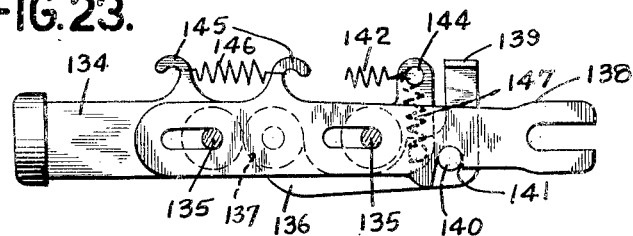
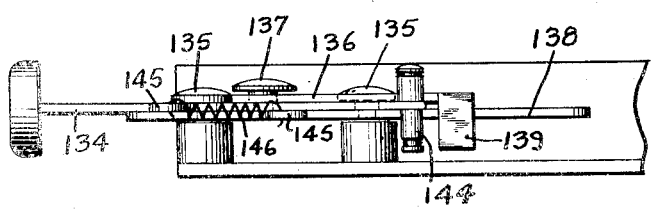
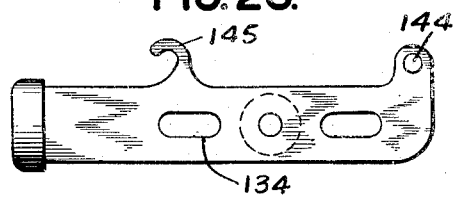
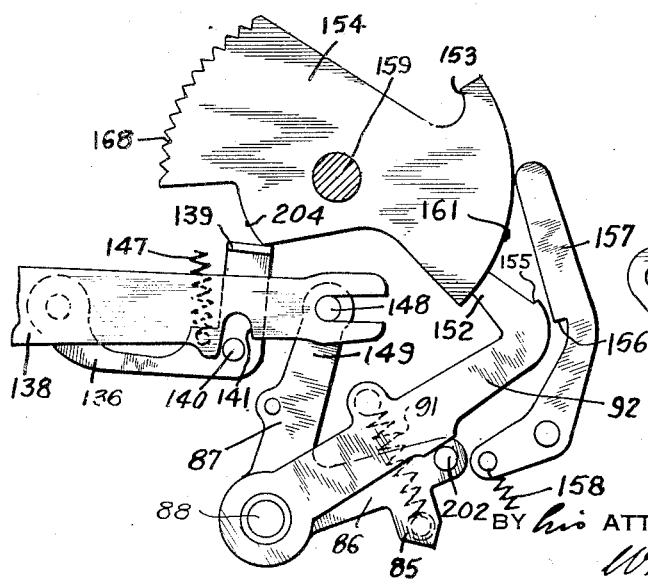
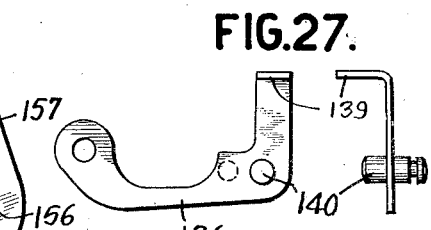
INVENTOR
E. J. Von Pein
BY his ATTORNEY Patented Jan. 7, 1936

2,027,077

UNITED STATES PATENT OFFICE 2,027,077

SCALE

Edward J. Von Pein, Dayton, Ohio, assignor, by mesne assignments, to International Business Machines Corporation, New York, N. Y., a corporation of New York Application January 5, 1931, Serial No. 506,650

33 Claims. (Cl. 265—5)

This case relates to recording and registering scales.

The object of the invention is to provide novel means for controlling a recording or the like mechanism by the weighing scale.

Further, the object is to provide means auxiliary to or supplementary to the weighing mechanism of the scale and controlled by the scale and an operating means therefor under a novel control.

Another object is to prevent the scale from setting controls for the auxiliary mechanism until the scale is substantially in equilibrium.

Still another object is to provide a record perforating means controlled by an automatic weighing mechanism.

Further, an object is to provide means for preventing repeated operations of the auxiliary device under control of a single weighing operation.

Still further, an object is to provide novel means for sensing the load on the scale to control the auxiliary mechanism.

Another object is to provide means for sensing loads below the normal indicating or registering capacity of the scale.

Further and other objects and advantages will be hereinafter set forth in the accompanying specification and claims, and shown in the drawings, which by way of illustration show what is now considered to be the preferred embodiment of the invention.

Figure 5:
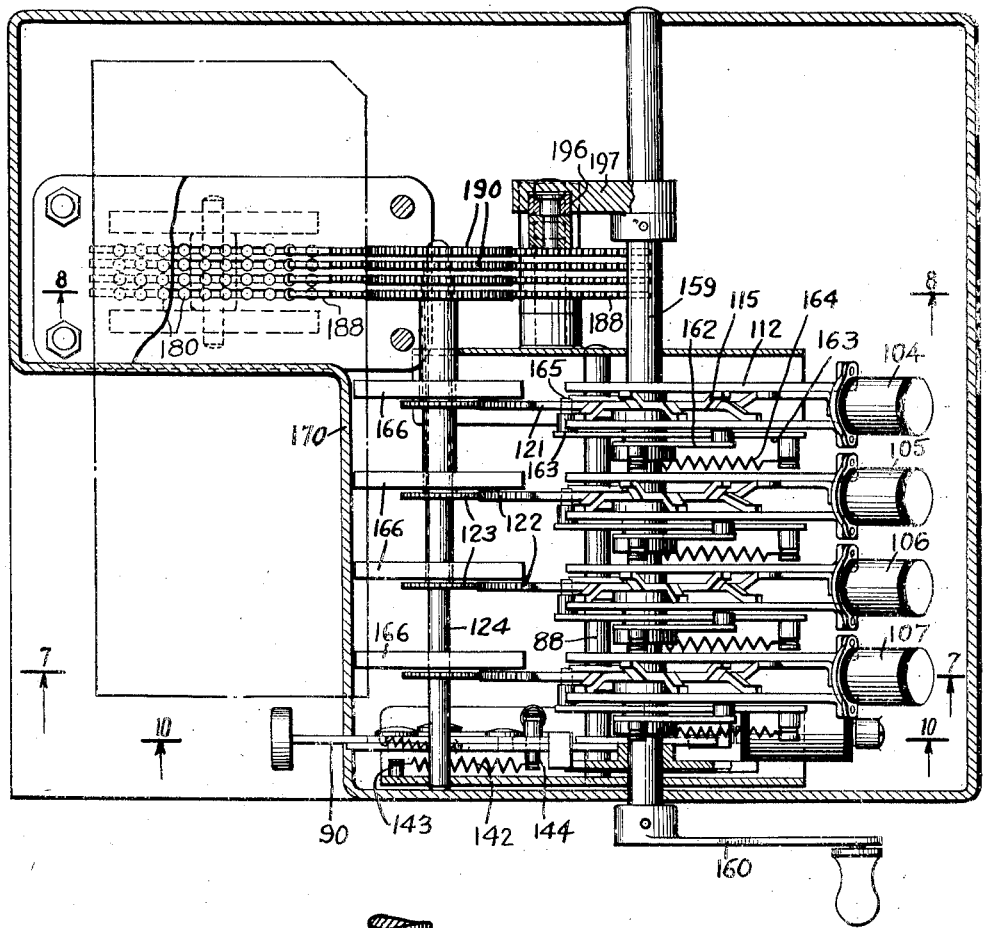
Fig. 5 is a plan sectional view through the recorder attachment.
Figure 7:
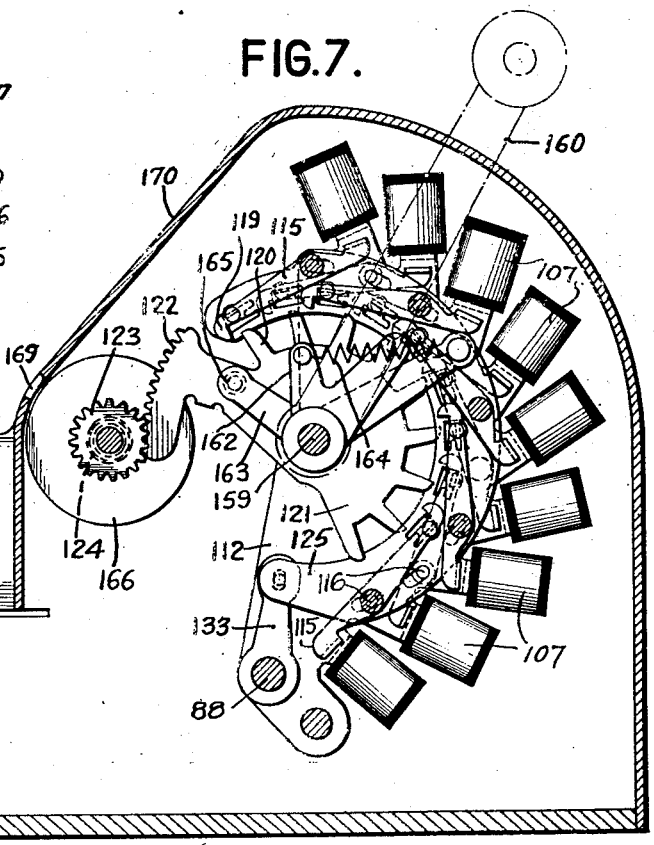
Figure 8:
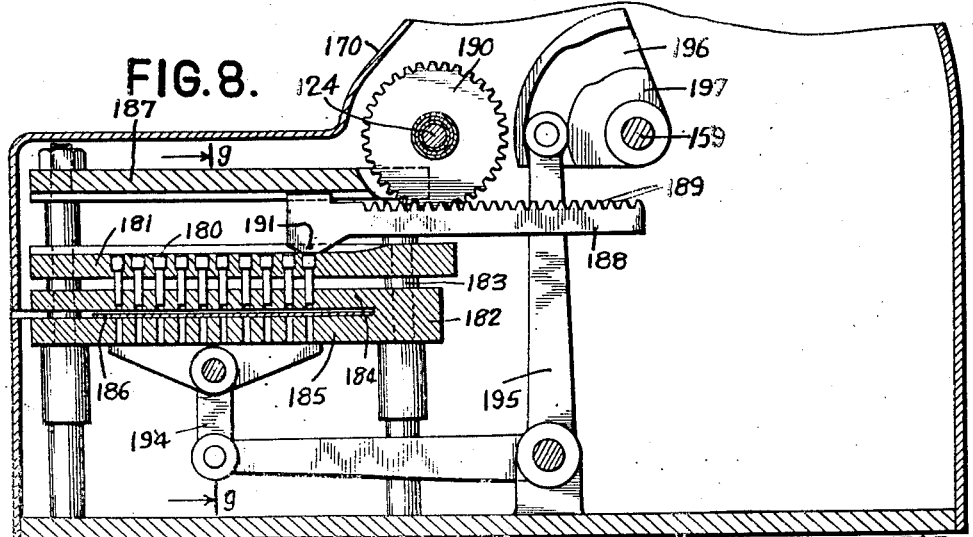

Figs. 7 and 8 are sections on lines 7—7 and 8—8 respectively of Fig. 5.

Figure 9:
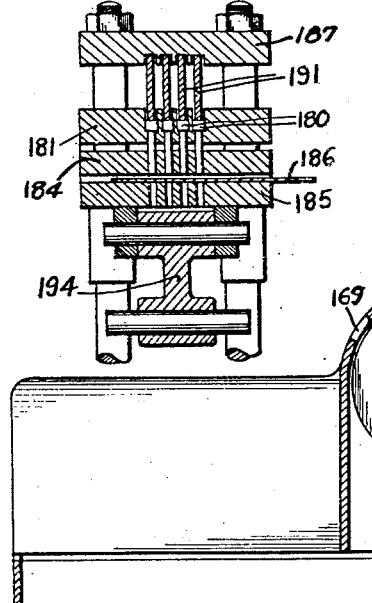

Fig. 9 is a section on line 9—9 of Fig. 8.

Figure 10:
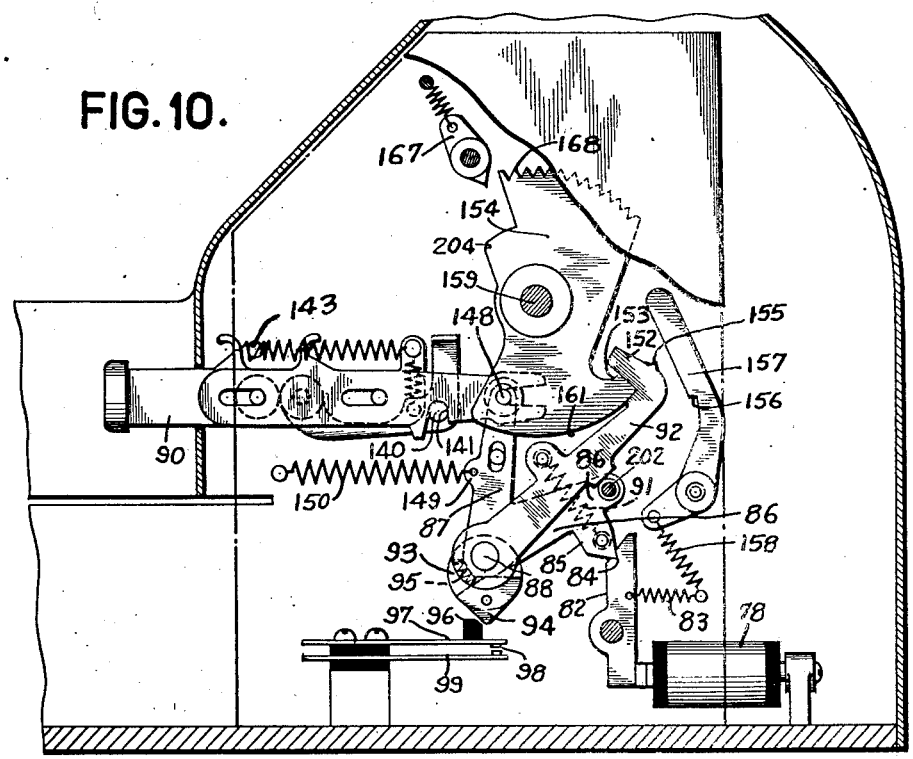

Fig. 10 is a section on line 10—10 of Fig. 5.

Figure 11:
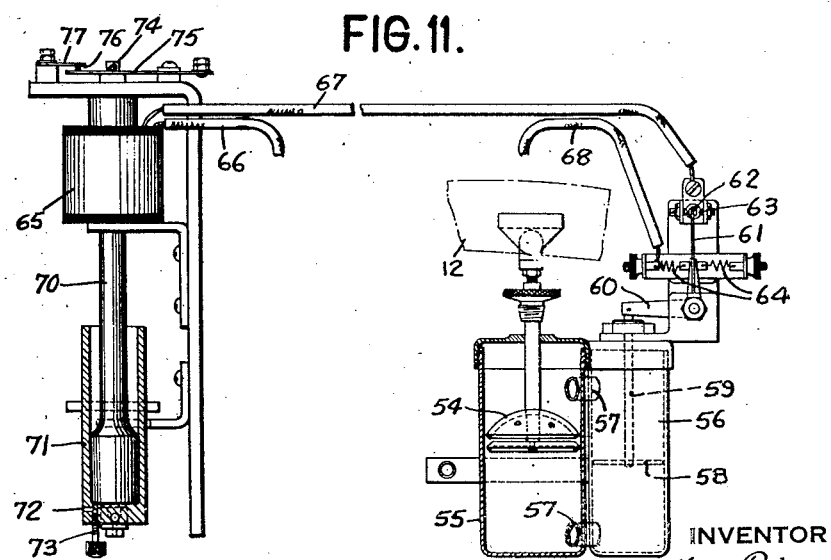

Fig. 11 is a detail of the equilibrium sensing means of the scale.

Figs. 12, 13 and 14 are details of the fractional pound scale.

Fig. 15 is a front view of another form of selector assembly for reading the load on the scale.

Figure 16:
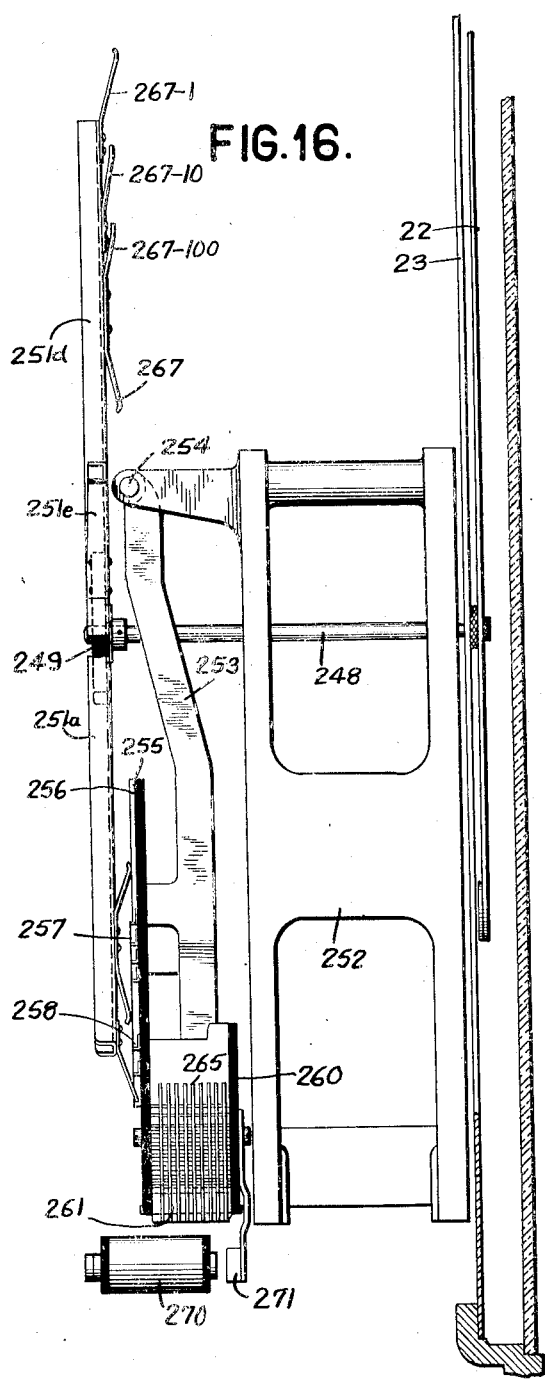

Fig. 16 is a side view of the selector assembly of Fig. 15.

Figure 17:
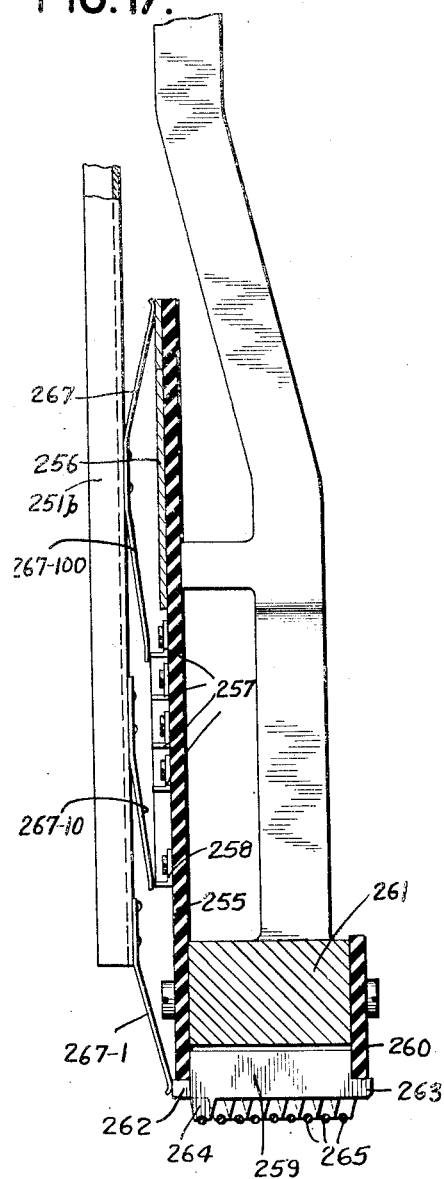

Fig. 17 is a section on line 17—17 of Fig. 15.

Fig. 18 is a circuit diagram of the second form.

Figure 1:
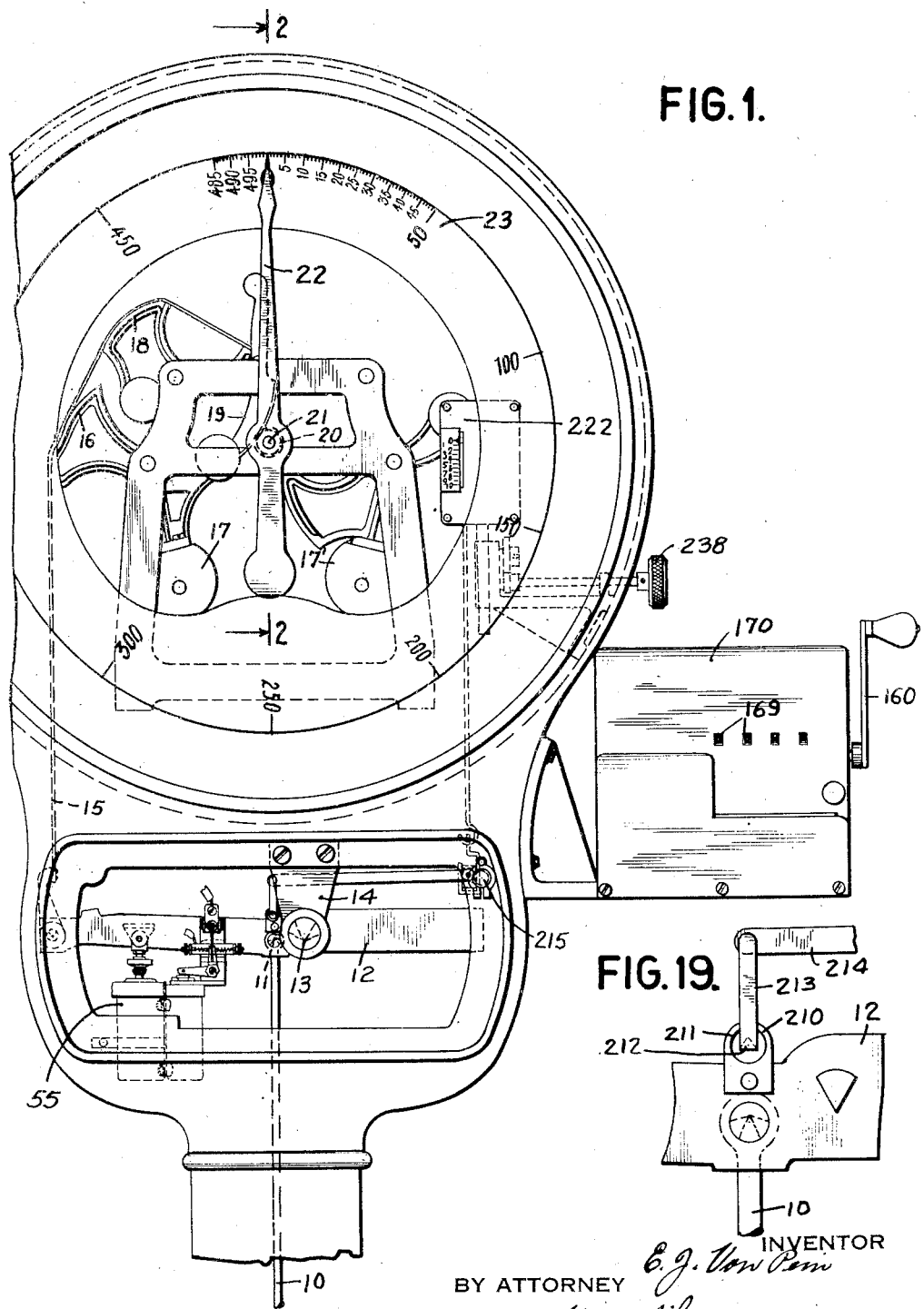
Fig. 1 is a front view of the scale and the auxiliary device attached thereto.

Fig. 19 is a detail of Fig. 1.

Fig. 20 is a circuit diagram of the first form of the invention.

Figs. 21 and 22 are details of the latching means for the stops of the recorder attachment.

Figs. 23 to 27 are details of the push button device of the attachment and

Fig. 28 is a view of the recorder device substantially similar to Fig. 10 but with the parts in a different position.

For the purposes of disclosure, the invention has been illustrated and described in connection with a scale of 500 lbs. capacity.

Referring to Fig. 1, the scale mechanism proper comprises any suitable platform and base lever system (not shown) acting on a draft rod 10 pivoted at 11 to the intermediate beam 12 pivotally suspended at 13 from a frame bracket 14. The intermediate beam at its left end (as viewed in Fig. 1) is connected to the tape 15 passing over and secured in succession to the power sector 16 of pendulum 17, the periphery of an intermediate member 18, and the power sector of pendulum 17'. The member 18 carries a rack 19 for operating pinion 20 on pointer shaft 21 to which is secured the pointer 22 cooperating with the dial 23 graduated in pounds from 0 to 500.

Selector mechanism

Figure 2:
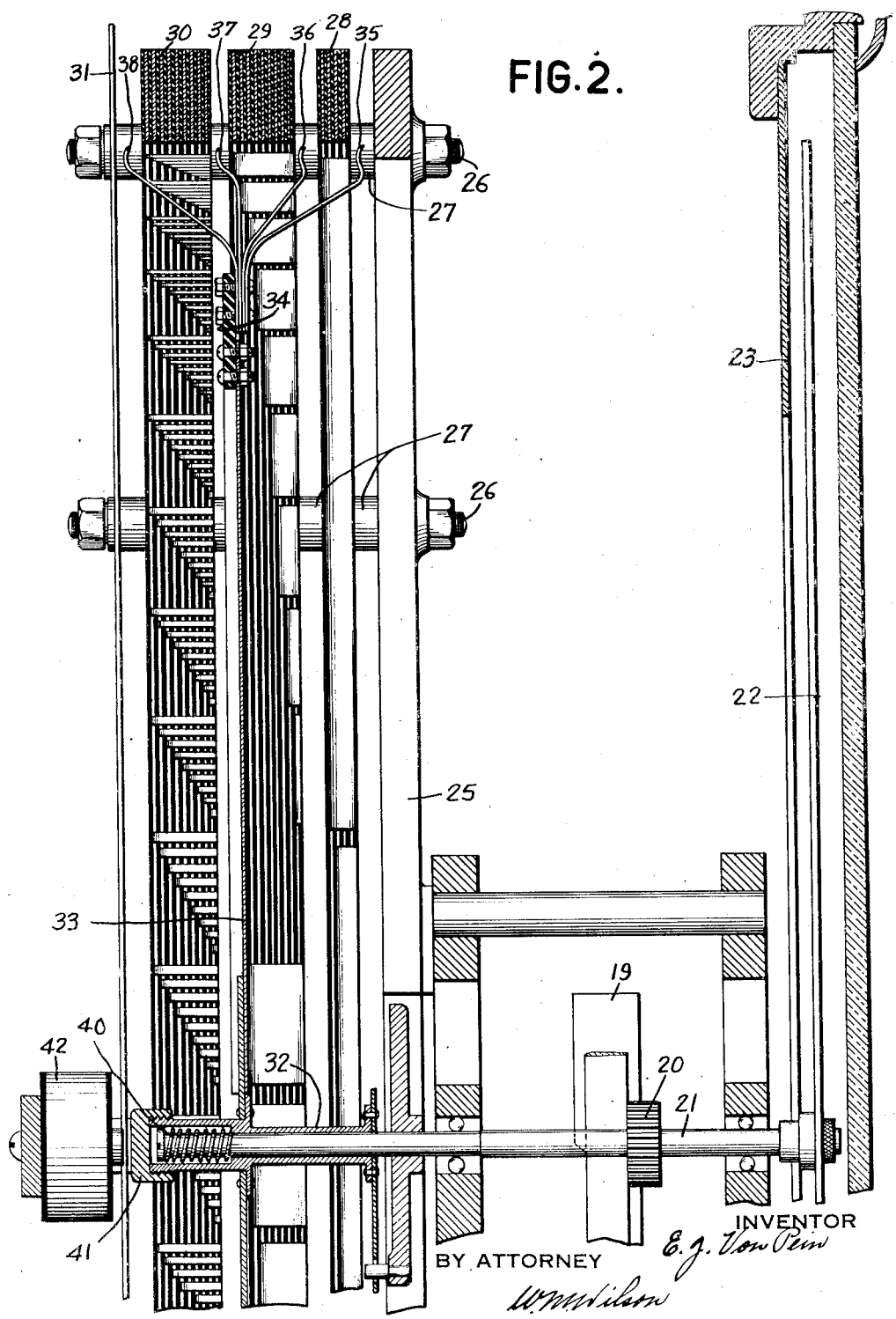
Fig. 2 is an enlarged section on line 2—2 of Fig. 1.

Referring to Fig. 2, back of dial 23 is a frame 25 to which is secured by bolts 26 and spaced relatively by washers 27 on the bolts selector rings 28, 29, 30 and conductive ring 31. The selector ring 28 is the hundreds pound denominational order ring, 29 is the tens pound denominational order ring, and 30 is the units pound denominational order ring. Slidably keyed to the pointer shaft 21 is a sleeve 32 provided with a radial arm 33 of aluminum or the like which has attached thereto an insulator block 34 carrying feeler springs for cooperating with the selector rings. Feeler 35 cooperates with hundreds ring 28, feeler 36 with the tens ring, feeler 37 with the units ring, and feeler 38 with the conductive ring 31. The sleeve 32 is hollow at the left end for housing a spring 40 encircling the pointer shaft and acting on the sleeve to normally urge it towards the right. The sleeve 32 is capped at the left by an armature 41 which is attracted against spring 40 when the magnet 42 is energized. In this manner, the feelers are brought into contact with their associated selector rings.

Figure 3:
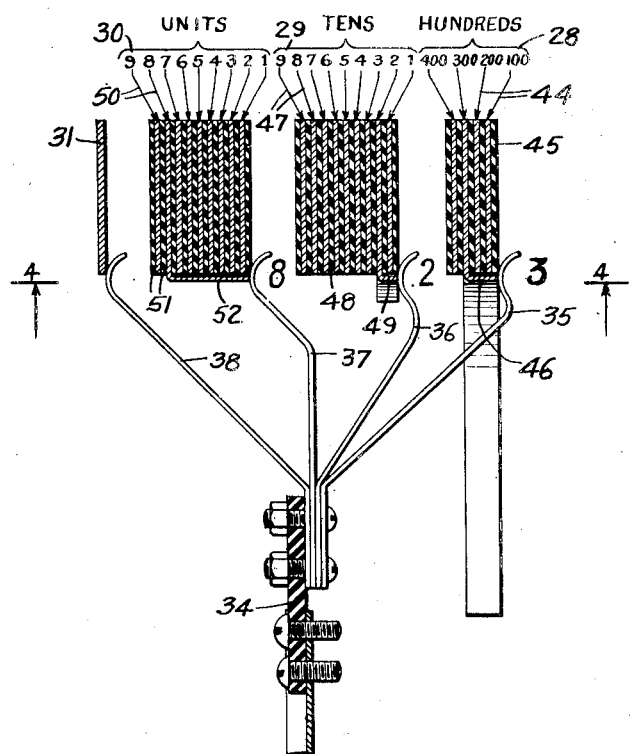
Figs. 3 and 4 are details of the selector or sensing devices for reading the load on the scale.
Figure 4:
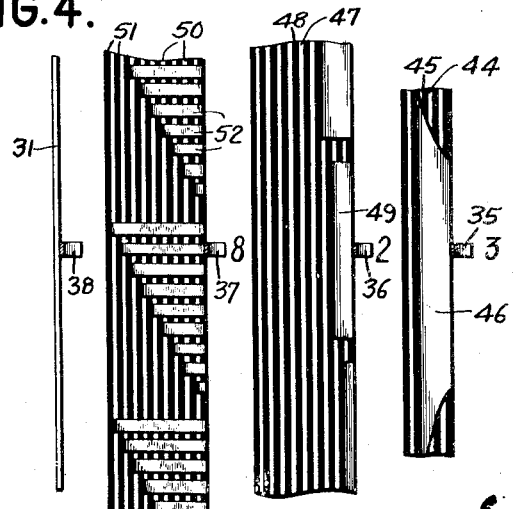

Referring to Figs. 3 and 4, the structure of the selector rings is as follows:

The hundreds ring 28 consists of four circular conductive plates 44 separated by insulator plates 45. Each plate has a projection bent transversely to the plane of the ring to form a contact segment 46 exposed for engagement by the feeler 35. The contact segments terminate in circumferential alinement and follow each other about the periphery, beginning with a point thereon opposite the 100 lbs. graduation on the dial 23. The first segment 46 occupies the span of the hundreds ring which is opposite the 100 to 199 lbs. span on dial 23, the second segment 46 occupies a span opposite 200 to 299 lbs. on the dial, and so on.

The tens ring 29 has nine circular conductive plates 47 separated by insulator plates 48. Each plate 47 has five transversely bent contact lugs 49 spaced apart equal distances circumferentially and representing the same number in the tens denomination. Thus, all the 20 lbs. positions corresponding to 2 in the tens denomination are selected by the five lugs of the second conductive plate from the right as viewed in Fig. 4. Since there are nine plates 47, each with five lugs 49, there will be forty five such lugs circumferentially spaced and each occupying a span equal to a nine pound span on the dial. The zeros of the tens denomination have no corresponding lugs 49. Thus, a reading of 102 will not find the tens feeler 36 in engagement with a contact lug but with the insulated portion of the ring between successive contact lugs. The first lug 49 begins at a point opposite the 10 lbs. graduation of dial 23 and terminates at a point opposite the 19 lbs. graduation, the second lug 49 begins at the 20 lbs. graduation and terminates at 29 lbs. and so on till the 99 lbs. reading.

The lug 49 after this reading begins at the 110 lbs. point and goes to 119, and so on. In this manner, the "0" of the tens denomination is not sensed by the tens ring.

The units or pounds ring 30 has nine conductive circular plates 50 separated by insulator disks 51. Each plate 50 has fifty transversely bent contact lugs 52, the lugs of each plate representing the same number in the units denomination. Thus, the plate 50 for selecting "3" in the units denomination has a lug 52 at the 3, 13, 23, 33, . . . 103, 113, . . . 203, 213, etc. pound positions For the zeros in the unit denomination, there are no lugs 52 necessary and hence none is provided.

The feelers are normally out of contact with the contact lugs on their associated selector rings. After the scale has come to rest under a load, the feelers are moved by magnet 42 into engagement with the lugs in a manner presently to be described. Thus, if a load of 328 pounds is on the scale, the feeler 35 will engage the lug 46 of the hundreds ring occupying the space opposite the 300 to 399 lbs. positions of dial 23, the feeler 36 will engage the lug 49 of the tens ring occupying the space opposite the 320 to 329 lbs. positions of the dial, the units feeler 37 will engage the lug 52 opposite the 328 to 328.9 lbs. positions of the dial, and the feeler 38 will engage the common return conductive plate 31.

To prevent the feelers from contacting the contact lugs of their associated selector rings until the true weight is shown on the dial which occurs when the parts have come to rest, the following mechanism is provided. This mechanism delays energization of magnet 42 for actuating the feelers until equilibrium has been reached. Referring to Figs. 1, 19, and 11, the intermediate beam 12 is pivotally connected to the plunger 54 movable within dash pot 55 containing the damping fluid. An auxiliary dash pot 56 is connected by pipes 57 to the upper and lower ends of the main dash pot. The damping fluid flows through these pipes to reach the same level in each dash pot.

Whenever the plunger 54 moves up or down, a surge will be set up in the damping fluid which will diminish as the plunger movement slows down and finally cease when the plunger comes to rest. The surge of the fluid in the auxiliary dash pot 56 causes the plunger 58 therein to vibrate vertically. The piston rod 59 at its upper end is pivoted to a bell lever device 60 of which the vertical arm 61 is a spring strip provided on opposite sides with contact points 62 each facing a cooperating contact point 63.

Opposing coil springs 64 engage arm 61 to normally hold the contact points 62 centrally between and spaced from contact points 63. Upon vibration of piston 54 and corresponding vibration of plunger 58 when the damping fluid is disturbed as has been above explained, the bell crank device vibrates back and forth causing the contacts 62 to alternately make and break rapidly with contacts 63. When either of contacts 63 are engaged by contacts 62, a circuit is completed through a solenoid coil 65. The circuit through solenoid 65 may be traced as follows, referring to the circuit diagram (Fig. 20): from the plus side of the power source through line 66 through the solenoid 65, line 67, spring blade 61, either one of contacts 63, line 68, and line 69 to the minus side of the power source. Cooperating with the solenoid 65 is a plunger 70, the lower end of which is enlarged and movable in an air dash pot 71. To provide for escape of air from the dash pot as the plunger 70 descends, a vent 72 is formed at the bottom of the dash pot. A threaded needle valve 73 enables adjustment of the effective area of the vent whereby the resistance against downward movement of the plunger may be varied.

Normally the plunger 70 is in its lowermost position as shown in Fig. 11. In this position, a pin 74 on the upper end of the plunger engages a spring blade 75 to disengage the contact point 76 thereof from the cooperating contact point 76 of an arm 77. When a circuit is completed through solenoid 65 upon vibration of the contact arm 61, as above explained, the plunger 70 is attracted, moves upwardly to release pin 74 from blade 75 and permits points 76 to make contact. When the scale parts come to rest, the plunger 59 stops vibrating and the contacts 62 and 63 open thereby deenergizing solenoid 65 and causing pin 74 to again open contacts 76.

Contacts 76 control a circuit through magnet 78, as follows: from plus line 66 through lead 79, magnet 78, line 80, contacts 76, blade 75, and lines 81 and 69 to the minus side. Energization of magnet 78 moves the armature member 82 against the force of spring 83 (see Figs. 10 and 20) placing the notch 84 on the upper edge of member 82 in latching cooperation with the triangular end of a lug 85. The latter is on arm 86 of a bell lever 87 freely rotatable on shaft 88 of the recorder bank. A push button 90 is adapted when depressed to swing lever 87 clockwise. This it is unable to do while member 82 is latched with lug 85 which occurs while magnet is energized.

As soon as the scale is in equilibrium however, the contact arm 61 stops vibrating and is brought by springs 64 to central position out of engagement with either contacts 63. The circuit through solenoid 65 is thereby opened and plunger 70 moves downward under its own weight, this movement being delayed by the resistance of the air in the dash pot 71. When the plunger reaches its lowermost position, pin 74 engages blade 75 to open contacts 76. The circuit through magnet 78 is thereby opened and spring 83 removes member 82 from under lug 85. Now when the push button 90 is pressed inwardly, the lever 87 is able to move clockwise. The arm 86 of lever 87 is connected by coil spring 91 to an arm 92 fast to shaft 88. The movement of arm 86 through spring 91 causes arm 92 to follow and operate shaft 88. Fast to the latter is a disk 93 to which is pinned a cam lug 94 movable clockwise relative to the disk against resistance of a coil spring 95. The cam lug is adapted to engage the projection 96 of the upper spring blade 97 carrying a contact stud 98 cooperating with a contact stud 98 on an arm 99. When the shaft 88 rocks clockwise, the cam lug 94 cams projection 96 downward, thereby closing contacts 98.

Closing of contacts 98 as above described energizes magnet 42 to attract armature 41 and move sleeve 32 and feelers 27 to 31 therewith towards the selector rings. Energization of magnet 42 is by the following circuit: From plus side through lines 100, 101, magnet 42, line 102, contacts 98, and lines 103, 81 and 69 to the minus side. The feelers now engage the contact lugs on the selector rings truly corresponding to the reading on the scale dial 23. This engagement effects energization of magnets in a recorder mechanism to control recording operations. Thus the closing of contacts 98 depends on the operation of the push button 90 which cannot occur until magnet 78 is deenergized under control of the dash pot mechanism for sensing the equilibrium of the scale under a load.

Recorder mechanism

Referring again to the circuit diagram (Fig. 20), there are four banks of recorder magnets; four magnets 104 in the hundreds bank, and nine each of the tens magnets 105, the unit magnets 106, and the fractional pound magnets 107. The control for the magnets 107 will be described hereinafter.

Each magnet of the hundreds bank is conductively connected to a corresponding one of the conductive plates 44 of the hundreds selector ring, each magnet of the tens bank is connected to one of the conductive plates 47 of the tens ring, and each magnet of the units bank is connected to a plate 50 of the units ring. When the feelers engage the contact lugs of the associated rings, the magnets are selectively energized to control a recording operation. Thus, the circuit through the magnet 104 of the hundreds bank for causing a recording of "3" in the hundreds denomination is completed as follows: from the minus side, through line 109, common conductive ring 31, its feeler 38, feeler 37 engaged therewith (see Fig. 2) contact lug 46 opposite the 300 to 399 lbs. span of dial 23, the magnet 104 connected to said lug 46, and through line 110 to the plus line 66. In a similar manner, circuits are completed through the selected magnets of the other banks.

Figure 6:
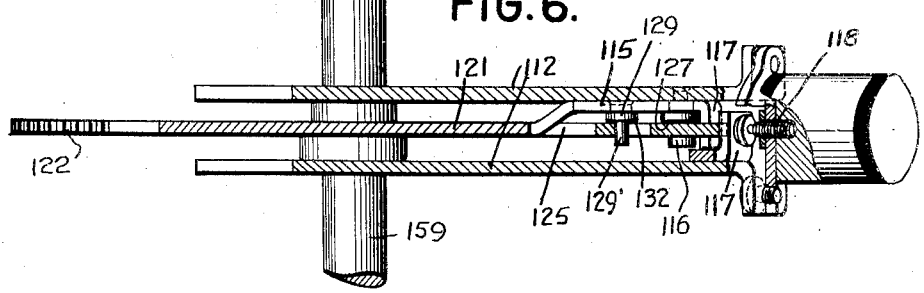
Fig. 6 is a detail of the attachment.

The magnets of each bank are carried between a pair of side frames 112 (see Figs. 5 and 6) and are arcuately disposed relative to each other on the frames. Cooperating with each magnet is a pawl 115. In the banks provided with nine magnets, the nine associated pawls are carried alternately by opposite side frames 112 on pivot studs 116 secured to the frames. Thus five pawls 115 are carried by one side frame and the four alternate pawls are carried by the other side frame. The pawls are provided with armature portions 117 cooperating with the recorder magnets and are normally held away from the magnets by compression springs 118 (see Fig. 6). The noses 119 of the pawls are each disposed opposite associated lugs 120 (see Fig. 7) integral with and extending in an arc about the member 121 of the bank. There are four such members, one for each bank and each member at the forward end has a rack portion 122 engaging a pinion 123 on one of the nested shafts 124 (see Figs. 5, 7 and 8). When a pawl is actuated by the associated recorder magnet it moves into the path of its associated lug 120. The pawl noses 119 are differentially disposed relative to their lugs 120, and are thus adapted to stop the movement of member 121 after it has moved one to nine steps. Thus the first pawl at the upper end (see Fig. 7) engages its lug 120 to stop member 121 after it has moved one step, the next pawl engages its lug 120 to stop member 121 after it has moved two steps, and so on.

The pawls after actuation by their associated magnets are locked in positions by detent plates 125. There is one such plate for each bank of pawls. Referring to Fig. 21, each plate has nine elongated slots 126 riding on the pivot pins 116 of the associated pawls of the bank and between the shoulders 127 of the oppositely disposed pins.

Adjacent its nose end 119, a pawl 115 has secured thereto a stud 129 having a rectangular shaped shank or tongue 129' (see Fig. 22) adapted to seat in either the notch 130 or 131 of one of the slots 132 of the detent plate 125. When a pawl is in retracted position, the tongue 129' of its stud 129 is opposite the notch 130 and when in actuated position, the tongue is opposite notch 131. Prior to actuation of the detent plate the studs are in the upper and wide part of the slot 132. When the detent plate is actuated upwardly, one of the notches 130 or 131 engages the tongues 129' of studs 129 of the bank of pawls associated with said detent plate to thereby maintain these pawls in their set positions, against movement. The detent plates are operated by arms 133 pinned to their lower ends, these arms being fast to the shaft 88 operated by push button 90.

Figs. 23 to 28 show the push button construction. It consists of three parts; an outer part 134 slidable on frame studs 135, a coupling latch 136 pivoted on stud 137 of part 134, and an inner part 138 also slidable on studs 135. The latch 136 has its upper edge bent angularly to form a tab 139 projecting over the top of the part 138. The latch also has a pin 140 receivable in a notch 141 in the lower edge of part 138. A coil spring 142 fixed to a stud 143 on the side frame and a stud 144 at the right hand end of the outer part 134 normally influences the latter outwardly to the inactive position. The parts 134 and 138 are provided with hooks 145 to which is secured a second coil spring 146 tending to move the parts towards each other. A third coil spring 147 extending between the latch 136 and the stud 144 of member 134 normally holds the pin 140 of the latch in the notch 141 of inner part 138. When the operator pushes on part 134, the part 138 is forced to move therewith by the coupling of pin 140 of latch 136 to notch 141 of part 138. The latter is forked to receive a pin 148 on the arm 149 of bell lever 87 and moves the bell lever clockwise against resistance of spring 150.

As explained above, the clockwise movement of bell lever 87 through spring 91 rocks the arm 92 and the shaft 88 thereof clockwise. The initial movement of the shaft causes the cam lug 94 to close contacts 98. This results in the energization of feeler control magnet 42 which moves the feelers 35—38 towards the selector rings and causes selective energization of the recorder magnets to actuate the pawls 115. The next movement of the shaft 88 results in arms 133 operating the detent plates 125 to lock all the pawls whether actuated or not in position. As the push button continues its movement, cam lug 94 rides off the projection 95 and contacts 98 open to deenergize the recorder magnets. At the same time blocking end 152 of arm 92 is released from the projection 153 at the right hand side of a member 154 (as viewed in Fig. 10). An integral shoulder 155 of the blocking end is then caught under the shoulder 156 of a pivoted latch 157 normally urged counterclockwise by spring 158.

The member 154 is fast to the operating shaft 159 of the recording device. The shaft is now free to be operated by actuation of a crank handle 160 (Figs. 5 and 7).

The operator through crank handle 160 rotates shaft 159 counterclockwise, as viewed in Fig. 10. As the member 154 rotates with shaft 159 the projection 153 thereof engages the latch 157 and releases it from the arm 92. However, the latter and the shaft 88 fast thereto remain in actuated position as the edge of blocking lug 152 on arm 92 rides on the concentric periphery of portion 161 of member 154.

Fixed to shaft 159 are four bell levers 162, one for each recorder bank. Between each lever 162 and a second bell lever 163 adjacent thereto and rotatably mounted on shaft 159 is a coil spring 164 by means of which the bell lever 162 yieldingly draws after it the bell lever 163. Each of the latter has a pin connection 165 to the associated member 121 of its recorder bank whereby movement of levers 162 and 163 cause corresponding movement of the members 121. The latter move until lugs 120 thereon contact the noses 119 of pawls 115 which have been actuated by the recorder magnets and locked in notches 131 of the detent plates 125. The engagement of lugs 120 with the actuated pawls stops members 121 in positions corresponding to the reading on the scale dial. During the movement of members 121 they have shafts 124 operated through racks 122 and pinions 123.

After members 121 have been stopped, the shaft 159 and bell levers 162 fast thereto continue to operate stretching the springs 164. The shaft 159 must be moved to the end of its stroke, the usual pawl 167 cooperating with teeth 168 in member 154 fast to shaft 159 to prevent return movement of the shaft until all the teeth pass the pawl at which time the stroke of the shaft has been completed. As shown in Figs. 5 and 7, each shaft 124 has fast thereto a register wheel 166 which may be viewed through the sight window 169 of the casing 170. Thus after the stroke of the shaft 159 counterclockwise (as viewed in Fig. 5) has been completed, the register wheels 166 will display a reading corresponding to the reading of the pointer 22 on dial 23.

This reading is permanently recorded by perforating mechanism operating on a tabulating card.

*Perforating device*

The card may be perforated according to any desired scheme known to the tabulating art but for purposes of illustration, the card is to be selectively perforated in one of ten differential positions of a column according to a scheme known as the Hollerith system. The punching device comprises a column of ten punches 180 for each recorder bank. The columns are arranged parallel to each other with the upper portions of the punches slidably guided for vertical movement in a fixed frame plate 181. A lower frame 182 is slidably movable on guide posts 183. The frame 182 is divided into two sections 184 and 185 separated by a narrow groove for receiving a record card 186. The upper section 184 serves to guide the lower portion of the punches while the lower section 185 serves as the usual perforated die plate. Slidably guided for movement between fixed plate 181 and the frame piece 187 above it are interposer bars 188, one above each column of punches. The bars 188 are provided with racks 189 in mesh with pinions 190 which actuate them to position the lugs 191 thereof above one of the punches in each column.

Each pinion 190 is fast to one of the series of nested shafts 124 (see Figs. 5 and 8). Thus when the rack members 121 are differentially positioned under control of the pawls 115, the shafts 124 simultaneously operate both the register wheels 166 and the pinions 190. The latter move the interposers 188 so that the lugs 191 thereon cover the punches 180 corresponding to the active pawls and to the reading of the register wheels.

After the interposers have been differentially positioned, the card 186 is punched by the frame 182 moving upwardly carrying the card with it. Those punches not restrained against upward movement by the interposer lugs 191 will move with the card surface while those punches restrained by lugs 191 will penetrate the upwardly moving card. In this manner, the card is perforated in accordance with the reading on the register wheels. To move frame 182, a link 194 is connected to the lower die plate 185 and to a bell lever 195 having its upper end received in the cam slot 196 of a member 197 fast to the operating shaft 159. The cam slot 196 is shaped to oscillate the bell lever 195 after the shaft 159 has moved an amount equal to the full forward stroke of the members 121.

After the punching operation, the operator reverses the movement of crank handle 160 and shaft 159 operated thereby. During this movement the blocking end 152 of the arm 92 rides off the concentric portion 161 of member 154. The spring 150 now actuates bell lever 87 counterclockwise and through stud 202 on arm 86 thereof engaged with the lower edge of arm 92 causes the latter to also rock counterclockwise. Shaft 88 rocks correspondingly and through arms 133 returns detent plates 125 to lower position thereby unlocking pawls 115 which are returned to normal positions by springs 118. During the same movement of shaft 88, the cam lug 94 rides over the lug 96 on upper contact blade 97. This causes clockwise movement of the cam lug about its pivot on the carrying disk 93. As explained before, the cam lug is free to move clockwise relative to said disk against resistance of a spring 88; hence the contact blade 97 is not actuated downwardly by the cam lug upon its return to initial position with shaft 88. The spring blade 97 is stiff enough to counteract the resistance of spring 95 to the clockwise pivoting of the cam lug on the carrying disk 93.

The parts of the recorder are now in initial position and ready for another operation under control of the feelers of the weighing machine.

Means are provided to prevent undesirable repeat operations of the recorder mechanism which may occur if the push button were depressed before arm 92 be released by concentric portion 161 of member 154. Before the arm 92 is released, detent plates 125 are still locking the pawls 115 in selectively actuated positions. These positions may be incorrect, if in the meanwhile, the load on the scale has been changed. Thus, if before release of arm 92 the operator presses the outer part 134 of the push button the latter through latch 136 will move the inner part 138 forwardly. The latter part thereby engages the pin 148 on arm 149 of the bell lever 87 and holds it stationary against the pull of spring 150. Now when the arm 92 is released, it is restrained from returning to initial position counterclockwise as it normally would due to the pull of spring 150. Therefore detent plates 125 remain in position for locking pawls 115 and operation of the handle 160 will repeat the record although the load on the scale may have been changed. In order to prevent this occurrence, the member 154 has a cam portion 204 which in the event that the push button has been held in engages the top bent portion 139 of latch 136 and depresses it against the resistance of spring 147 (see Fig. 28). Latch 136 is thereby uncoupled from part 138 and spring 150 is sufficiently strong to overcome the resistance of spring 146 between parts 134 and 138 and move the bell lever 87 counterclockwise without interference by part 138 and its connected push button parts thereby restoring the detent plates 125 to initial position for releasing the pawls 115.

In this manner, it is assured that each cyclical operation of the crank handle will effect only a single registration and punching operation under control of a single sensing operation of the selector rings of the scale by the feelers. The changing of the load on the platform will therefore be incapable of affecting the recording operations after the push button has been once operated upon the parts of the scale coming to rest under the original load.

*Fractional pound scale*

Means are provided for reading and selecting tenths of pounds to be recorded. It is understood that tenths of pounds are selected as an illustration and the same principles may be used to measure and record any other desired fractions.

The fractional pound selector structure will be explained with reference to Figs. 1, 12, 13, 14, 19 and 20. As shown in Figs. 1 and 19, the intermediate beam 12 above the fulcrum 11 has attached thereto a plate 210 having a hole 211 within which is a knife edge 212 at the lower end of a rod 213. The latter is pivoted to a horizontally disposed lever 214 which is mounted in a ball bearing 215 carried by the frame of the scale. Between the bearing 215 and the rod 213 the lever 214 is provided with a knife edge 216 cooperating with a bearing agate 217 carried by a stirrup 218 suspended from a rod 219. This rod is connected at its upper end to a spring 220 which in turn is connected to a threaded member 221 fixed to the frame 222 of the fractional pound scale. Fast to the frame 222 is the chart 223 graduated in tenths of pounds from 0 to 1 pound. Connected to the rod 219 below spring 220 is a U-shaped member 224 one end of which serves as a pointer 225 coacting with chart 223 while the other end 226 serves as a contact element adapted to slide along the commutator 227 and selectively engage one of the nine commutator disks 228 separated by insulator disks 229. The latter are spaced apart the same distance as the tenths of pounds graduations on chart 223.

The frame 222 has fixed thereto a depending guide rod 230 slidably and non-rotatably fitting in a hole in the bracket 231. One side of this hole is open to expose rack teeth 232 formed on the rod 230. In mesh with the rack teeth 232 is a pinion 233 fast to a short shaft 234 carrying exterior to bracket 231 a gear 235 meshing with a pinion 236 pinned to a shaft 237 having a manual operating knob 238 at one end. The opposite end of the shaft 237 extends within the bracket 231 and is frictionally engaged by a spring-pressed plunger 239 serving as a brake.

In operation, when a load is placed on the scale platform, the intermediate beam 12 moves down and carries with it the rod 213, thus actuating lever 214, rod 219 and through spring 220 pulling down on frame 222. The only resistance this imposes on the lever 12 is due to the friction set up by the parts of the fractional pound scale as they move in the bracket 231. Due to this friction, however, the reading on the dial is not quite accurate. However, if the knife edge 212 be freed of the edges of the hole 211 in the plate 210 attached to lever 12, then the latter will be free of the friction imposed by the fractional pound scale. Accordingly after the scale has been loaded and the pointer practically come to rest, the knob 238 is turned towards the operator facing the front of the scale thus through gears 236, 235, rotating pinion 233 to actuate toothed bar 230 downward thereby causing lever 214 and rod 213 to descend. The knob 238 is turned in this manner until the knife edge 212 is entirely free of the edges of hole 211. The scale pointer 22 will now indicate the true weight of the load.

The fractional pound scale now has its pointer at "0" of chart 223. The knob 238 is then turned away from the operator, thus through gearing 236, 235, 233, and 232 moving the frame 222, spring 220, rod 219, lever 214, rod 213, and knife edge upwardly. The fractional scale will indicate "0" until the knife edge engages the upper edge of hole 211 and starts to lift the lever 12. The spring is then being pulled down on at one end by the force of lever 12 acting through lever 214 and rod 219 while at the other end the spring is pulled up by frame 222 actuated by knob 238. The parts are so proportioned that the spring will stretch between rod 219 and frame 222 to cause relative movement of said rod relative to said frame to indicate one tenth of a pound for each tenth of a pound of a load on the platform relieved from acting on lever 12. In effect, the spring 220 may be considered as hooked directly to the lever 12. The latter is being pulled down by the load on the platform. If the spring is pulled up it will move the lever 12 against the pull of the load partially counteracting the force of the latter on the lever. The further the spring is pulled the more it is stretched and the more load it counteracts. In effect, the pull of the spring is adding to the counterbalancing force of the pendulums. Knob 238 is operated to stretch the spring and pull up on lever 12 until pointer 22 is moved back to an even pound graduation. The pointer 225 will then indicate on chart 223 the fractions of a pound of pull exerted by the spring 220 to move the scale pointer 22 to an even pound graduation. The friction brake 239 acts on shaft 237 to hold the parts in the position to which they have been actuated by knob 238.

Within the frame 222 are two magnets 240 cooperating with a hinged armature 241 which rigidly carries the commutator 227. After the fractional pound scale has been adjusted to give the fractional pound reading, as above described, the push button 90 is operated to close contacts 98 in the manner hereinbefore explained for completing the circuit through the feeler control magnet 42. Simultaneously, a parallel circuit is completed through magnets 240. The armature 241 when attracted moves commutator 227 towards the contact point 226 which is in position to engage the contact disk 228 corresponding to the fractional pound indication on chart 223. This closes a circuit from minus line 249, through the contact 226, the conductive disk 228 engaged thereby, the line 244 connecting this contact disk to the control 107 of the fractional pound recorder bank, through line 110, and to plus line 66. Energization of a magnet 107 moves the pawl 115 operated thereby into the path of the associated member 121 in the same manner as already explained in connection with the other recorder banks.

Figs. 15 to 18 illustrate the invention in simpler, more compact form. In this modification the graduated dial 23 cooperating with pointer 22 and the weighing means for actuating the pointer are the same as in the other modification. The selector parts for controlling the pounds, tens of pounds, and hundreds of pounds recorder however are of different construction. The indicator shaft 248 (see Figs. 15 and 16) is fixed against axial movement and carries at the rear end a hub including a spider 249 of fibrous insulating material.

The spider has five evenly spaced radial spokes to each of which is attached one of the conductive arms 251. The distance between a pair of arms is equal to a span of 100 pounds on the dial 23. Between these radial arms 251 and the frame 252 of the scale a bracket 253 is freely pivotally suspended from a shaft 254. The bracket carries a selector assembly for cooperation with arms 251. The selector assembly is largely mounted on a plate 255 of insulating material facing the radial arms 251.

To this insulating plate are attached a common return conductive plate 256 and below the latter, four segmental parallel conductive bands 257a, b, c, and d. The latter respectively represent 100, 200, 300, and 400 pound readings. Below the band 257d the insulator plate carries nine conductive members 258, arranged in a row and representing 10, 20, 30 . . . 90 pound readings. Below the members 258, is a row of ninety conductive unit bars 259 arranged side by side and separated by insulating material. The unit bars are clamped between the back of insulator plate 255 and an insulator plate 260 carried by the back of the bracket rim 261. Each unit bar has a front and rear projecting lug, respectively 262 and 263, which engage the lower edges of the plates 255 and 260 to locate the bars vertically in position. The front lugs 262 also serve as contacts of which there are ninety, one for each unit bar. Each lug represents except for the zeros, one of the pound positions of a hundred pound span. The unit bars are also formed with depending lugs 264 grooved at their lower ends to receive a segmentally extending copper wire 265.

The grooved lugs 264 representing 1 in the unit denomination are arranged in a segmental row, the lugs 264 representing 2 in the unit denomination are arranged in a row behind the row representing "1's", and so on. There are thus nine such rows, one for each number in the unit denomination except the zero. Each row has ten lugs 264; for example, the row representing 1's has a lug 264 in the 1, 11, 21, 31, 41, 51, 61, 71, 81, and 91 pound positions of a hundred pound span. The copper wire 265 is soldered in the grooves of all the lugs 264 of a single row thus connecting all the lugs representing the same number in the unit denomination. Each copper wire is connected to one of the control magnets 106 of the unit recorder bank.

Of the "tens" contacts, the first one begins at the point radially alined with the space between the unit lug 262 representing 9 and 11 pounds. This "tens" contact extends to a point radially alined with the unit lug 262 representing 19. The second "tens" contact extends from the point between the "19" and "21" pound unit lugs 262 to the unit lug representing "29", and so on for the other "tens" contacts.

Each of the nine "tens" bars 258 is connected to one of the nine control magnets 105 of the tens recorder bank. Each of the four "hundreds" bands 257 is connected to one of the four control magnets 104 of the hundreds recorder bank.

The conductive members 256, 257, 258 and 259, comprise the selector assembly and occupy a sector equal to that bounded by a pair of radial arms 251 carried by the pointer shaft 250. Fig. 15 shows the position of the arms at zero load. Each of the five arms 251 carries a number of contact springs 267 arranged along a radial line to selectively engage the selector assembly.

The arms move into cooperation with the selector assembly in succession as the pointer 22 successively spans each fifth of the complete circle of readings on the dial 23. Thus, arm 251a moves across the selector assembly while the pointer is moving from 0 to 99 on the dial, the arm 251b moves across the selector assembly while the pointer is moving from 100 to 199 on the dial, arm 251c when the pointer moves from 200 to 299, and so on. The arm 251a as may be understood from Figs. 15, 16 and 17 has a contact spring 267 engaging the common return plate 256, a contact spring 267—10 for engaging the tens contacts 258, and a contact spring 267—1 for engaging the units lugs 262. The arm 251a has no contact spring for engaging a hundreds band 257 since it is designed to read 1 to 99 pounds. The next arm 251b has in addition to the contact springs of arm 251a a contact spring 267—100 adapted to sense the hundreds band 257a representing "1" in the hundreds denomination, the arm 251c has a contact spring for engaging hundreds band 257b, representing 2 in the hundreds denomination. Similarly, the arms 251d and e respectively sense 300 and 400 pound readings.

The various contact springs 267 are free of the selector assembly during a weighing operation but after the pointer 22 comes to rest, the push button 90 is operated as in the previously described modification to cause engagement between the contact springs and the selector assembly. In this modification, instead of moving the feelers into contact with the selector assembly, the latter is moved towards the feelers. To accomplish this, a magnet 270 (Figs. 15 and 16) in shunt with the circuit of the magnet 42 is energized in exactly the same manner as feeler control magnet 42 of the first modification to attract an armature 271 rigidly attached to the insulator plate 260 of the bracket 253.

The latter is thereby swung on shaft 254 towards the contact springs 267 of an arm 251, and engagement is effected between the contact springs 267 and those contacts of the selector assembly which are in radial alinement with the springs.

Circuits are thus established through the control magnets of the hundreds, tens, and units bank.

As in the first modification, a fractional pound indicating and recording mechanism is provided.

The operation of the second modification will be explained with reference to the circuit diagram (Fig. 18). Assume that the pointer reads 417.6 pounds on the dial. The operating knob 238 of the fractional pound scale is manipulated to move the pointer to the even 417 pound mark of the dial. In so doing, the pointer 225 will register 0.6 pound on the chart 223 of the fractional pound scale. The radial arm 251e is now over the selector assembly and contact spring 267—100 thereof is opposite the hundreds band 257d representing 4 of the "hundreds" denomination, the spring 267—10 is opposite the first tens contact 258 from the right as seen in Fig. 18 and the spring 267—1 is opposite the seventh unit contact 259 from the right. After the fractional pound scale has been adjusted the pointer is at rest; accordingly dash pot contact blade 61 is in central position and the solenoid 65 is deenergized, thus deenergizing magnet 78 to release the latch 82 from arm 86 of the bell lever 87 operated by the push button 90. The latter is therefore free to be depressed to effect closing of contacts 98. This simultaneously completes a circuit through the feeler control magnet 240 of the fractional pound scale and the feeler control magnet 270 of the main scale.

Magnet 240 thereupon moves the commutator roll 227 towards the feeler 226 which engages the commutator disk 228 representing 0.6 pound position. This energizes the magnet 107 of the fractional pound recorder bank to indicate and record 6 in the fractional pound column. Magnet 270 being energized, swings the bracket 253 towards the radial arms 251, and the contact springs of arm 251 will therefore in the example given above, engage hundreds segment 257d thereby establishing a circuit through the magnet 104—4 of the hundreds bank corresponding to the pawl 115 for stopping the hundreds bank member 121 to register and record 4 in the hundreds denomination. The circuit through the magnet 104—4 is completed as follows: From the minus side through line 281, common conductive plate 256, radial arm 251e, contact spring 267—100, hundreds segment 257d, line 282 connected with the latter, magnet 104—4 and line 283 to the plus side of the power source. Similarly, a control magnet in the tens and hundreds bank is energized to record respectively 1 and 7. The crank handle 160 is now operated and the reading indicated on wheels 186 is 417.6 while the card 186 is perforated to represent this number.

While preferred embodiments of the invention have been disclosed, it is understood that changes may be made within the purview of the invention without departing therefrom. It is therefore desired to be limited only by the scope of the following claims.

I claim:

1. Means for controlling mechanism from a weighing scale; comprising in combination, a variably positionable feeler seeking an equilibrium position corresponding to a load on the scale, a load translator including a series of elements disposed along the path of movement of the feeler, each element corresponding to a different load, means for causing the feeler to cooperate with one of said elements for controlling operation of said mechanism, and means for automatically sensing whether the feeler has come to rest and delaying cooperation of said feeler with any of the elements until the feeler has come to rest under a load.

2. Means for operating mechanism according to operation of a weighing scale; comprising in combination, an actuator for the mechanism, a member for preventing operation of the actuator, elements movable relative to each other for governing the operation of the mechanism by the actuator, means for automatically selecting the elements for setting according to the operation of the scale, and means controlled by operation of said member to release the actuator for preliminarily and automatically setting the elements according to their selection by the weighing scale.

3. In a machine including weighing mechanism; the combination of control devices corresponding to different load values differentially selectively settable under control of the weighing mechanism in accordance with the load, mechanism auxiliary to the weighing mechanism controlled by said devices, and means for preventing setting of the control devices by said weighing mechanism until the latter is substantially in equilibrium.

4. Means for operating mechanism according to operation of a weighing scale; comprising in combination, an actuator for the mechanism, a push button having means to prevent operation of the actuator, elements movable relative to each other for governing operation of the mechanism by the actuator, means for automatically selecting the elements for operation according to operation of the scale, circuits for causing operation of the selected elements, and means controlled by the operation of the push button in releasing the actuator for causing the circuits to be completed to operate the selected elements.

5. In a machine including a scale and mechanism supplementary to the scale; the combination of a control device for the supplementary mechanism, an electrical circuit for controlling said device, said circuit including in series a plurality of cooperable electrical elements relatively displaceable under control of the weighing mechanism in accordance with the load, and means for preventing completion of the circuit until the weighing mechanism is in substantial equilibrium under a load.

6. In a machine including weighing mechanism, the combination of control devices settable by said weighing mechanism according to the load, recording mechanism controlled by said devices, means for operating said recording mechanism, and means controlled by said operating means for preventing more than one operation of the recording mechanism under control of a single setting of the control devices by said weighing mechanism.

7. In a machine including weighing mechanism, the combination of control devices settable by said weighing mechanism according to displacement thereof, means for holding the control devices in set positions, manual means for operating said holding means, a recording mechanism operable under control of said devices, and means for restoring the holding means to ineffective position after an operation of the recording mechanism irrespective of the maintained operation of the manual means.

8. In a machine including means to be controlled for operation according to operation of weighing mechanism; the combination of control devices for said means, electrical circuits for controlling said devices including selector terminals extending along and covering a certain weight range, and a series of feeler members successively movable by the weighing mechanism one after another proportionally to the load, along said weight range for cooperation with the selector terminals to select the circuits for operation.

9. In a machine including means to be controlled according to operation of weighing mechanism; the combination of control devices for said means, electrical circuits for controlling said devices including a selector contact segment and a series of rotatable, radially arranged feeler arms successively rotatably movable by the weighing mechanism one after another, in accordance with the load, into the field of the selector segment for cooperation with the latter to select the circuits for operation.

10. In a machine including weighing mechanism, the combination of means automatically controlled by the mechanism for sensing certain denominations of the load, manually controlled means limited to sensing a denomination of the load below the lower order of the first-mentioned denominations, and mechanism controlled by both sensing means.

11. In a machine including weighing mechanism of the automatic type movable in one direction by the load, the combination of means for moving the mechanism in the opposite direction to relieve a fraction of the lowest unit of load thereon, and recording mechanism controlled by said means to record the amount of load relieved thereby.

12. In a machine including force measuring mechanism, the combination of a series of control elements, means controlled by the mechanism in accordance with its displacement for selectively setting said elements, an auxiliary device controlled by said elements, manual operating means for said device movable through a predetermined cycle, and means for preventing restoration of said operating means before it has completed said predetermined cycle.

13. In a machine including variably displaceable weighing mechanism, the combination of a series of magnets, control elements operated thereby, electrical circuits selected under control of said mechanism in accordance with displacement thereof for energizing only one of said magnets upon each weighing operation, and means for delaying energization of any of said magnets until the mechanism is in equilibrium.

14. In a load weighing machine, the combination of a recorder for making a record related to the load, means for operating the recorder to make said record, a device for locking the operating means against operation, means for sensing the equilibrium condition of the machine, a release for said locking device, and means for electrically controlling said release from the equilibrium sensing means.

15. In a load weighing scale, a recorder for making a record related to the load, a handle for operating the recorder to make said record, a detent for preventing operation of the handle, a device for sensing the equilibrium of the scale, means for releasing said detent from locking cooperation with the handle, and means for electrically controlling said releasing means from the equilibrium sensing device.

16. In a machine including weighing mechanism and means auxiliary to said mechanism; the combination of control elements means other than the weighing mechanism for differentially setting said control elements under control of the mechanism in accordance with different load values, an actuator for differentially operating said auxiliary means under control of said elements and in accordance with the load setting of the elements, means for mechanically maintaining the load setting of said elements, and means for automatically rendering said maintaining means ineffective at the end of a single operation of the auxiliary means under control of the load set elements.

17. In a machine having load influenced parts and means auxiliary to said parts, the combination of an electrical equilibrium sensing device including a contact vibration of which is set up upon movement of the load influenced parts, a plurality of stationary cooperating contacts alternately engaged by said vibrating contact during to and fro movement of the latter, said vibrating contact being normally free of the stationary contacts while the load influenced parts are at rest and a control circuit for the auxiliary means completed by engagement of said vibratory contact with either of the other contacts.

18. In a machine including load responsive mechanism and mechanism auxiliary to the load responsive mechanism; the combination of an electrical control for said auxiliary mechanism operation of which is determined by the load responsive mechanism, said control including a series of control circuits corresponding to digits of one denominational order and having in common a conductive feeler positionable under control of the load responsive mechanism and a plurality of conductive members one behind the other and insulated from each other, each member corresponding to one of said circuits and each member having an extension projecting into a common plane for coaction with the aforesaid feeler, the extensions being disposed at different load points in accordance with the digits of a denominational order of the load whereby the feeler selects an extension completing one of said control circuits in accordance with the digit of the load in aforesaid denominational order.

19. In a machine including load responsive mechanism and mechanism auxiliary to the load responsive mechanism; the combination of an electrical control for said auxiliary mechanism including a plurality of control circuits arranged in different series, each series corresponding to the digits of a different denominational order of a load, a plurality of conductive elements controlled by operation of said load responsive mechanism and rotatably mounted and axially spaced relative to each other, each conductive element corresponding to a different one of said denominational orders and each common to all the circuits of its own denominational order, and banks of conductive members, each bank corresponding to one denominational order series of circuits, the banks being arranged in axially spaced relative positions each conductive element upon a weighing operation traversing the members of the corresponding denominational order bank to select one of the members and the corresponding circuit of said denomination for operation in accordance with the digit in said denominational order of the load.

20. In a scale, mechanism of the automatic counterbalance type automatically displaceable in accordance with a major order of the load, other mechanism positionable in accordance with the minor order of the same load and having a maximum range determined by the maximum value of said minor order of load, said minor order mechanism being operable independently of the major order mechanism and including therein variable counterbalancing means operated upon movement of said minor order mechanism to resist the minor order load, and means operable under control of both mechanisms.

21. In a scale, mechanism automatically displaceable in accordance with the load, means positionable only in accordance with a minor portion of said load and means cooperatively connecting said first-named means to aforesaid mechanism to operate the latter when said first-named means is so positioned to subtract from the first-named mechanism the effect of the aforesaid minor portion of the load.

22. In a machine including weighing mechanism and a device to be controlled thereby; the combination of means for operating said device, a normally locked manipulative control for the operating means, and an equilibrium sensing device operable by the weighing mechanism and including a magnetically controlled release for the manipulative control.

23. In a scale, a load operated beam and means coacting therewith for indicating the major denominational orders of the load, an auxiliary scale including a variable resistance and an indicator controlled by the latter resistance for indicating only a minor denominational order of said load, and manual means for moving said auxiliary scale into coaction with the aforesaid beam to operate said resistance and indicator in accordance with said minor order of the load and to simultaneously operate said beam to move the first-named indicating means to an even division of the major order of the load.

24. In a machine including weighing mechanism, the combination of a series of electrical control circuits, devices controlled by said circuits, a conductive feeler common to all said circuits and variably displaceable by said weighing mechanism in accordance with the load, a plurality of conductive members each in a different one of said circuits and each selected by the feeler in accordance with a different load position of the feeler, a movable mounting for said plurality of conductive members, and a device for moving said plurality of members on their mounting bodily towards said feeler to effect engagement of the feeler with the conductive member selected thereby to correspondingly select one of the control circuits for operation.

25. The combination as defined in claim 24, said mounting comprising a frame, a common support for the conductive members, and a pivotal connection between the support and frame.

26. In a scale, a main load weighing mechanism, a fractional load weighing mechanism including therein an automatic counterbalance having a maximum counterbalance range of a predetermined fraction of the load, manual operating means for the fractional weighing mechanism, a recorder for making a record related to the load on the scale, and a device controlled by the fractional weighing mechanism for delaying the making of a record by the recorder while the fractional weighing mechanism is being operated.

27. In a machine including force measuring mechanism; a control, electrical means and circuits therefor for setting said control in accordance with displacement of said mechanism, means to maintain the setting of said control after the circuits have been broken, a device settable by said control, an actuator for said device, mechanism operated by the actuator for preventing the second-named means from releasing said control for restoration until the actuator has completed its operation of said device.

28. In a machine having load responsive mechanism of the automatic type including a control element having variable equilibrium positions under varying loads to control means according to the load; the combination of an actuator for said means to operate the latter as determined by said element, a manual member for preventing operation of the actuator, a latch for preventing release of the manual member to a position in which it renders the actuator effective to operate, and an electrical release for removing the latch from such restraining coaction with said member to thereby release the member for manual movement into its aforesaid position.

29. The invention according to claim 28, said electrical release including means for sensing whether the control element is at rest in any of its equilibrium positions to cause release of said member when the element is at rest.

30. Means for controlling a device according to operation of a weighing mechanism; comprising in combination, a series of selector elements moved in response to a load on said mechanism and spaced apart in the direction in which they are moved proportionately to a predetermined load, a series of bands arranged parallel to each other and occupying the same portion of the path scanned by the selector elements and of a width equal to the distance between the successive elements whereby each of the latter is adapted to successively span the path portion occupied by said bands, each of said elements being arranged to cooperate with only one of said bands, each band and its associated element corresponding to a different multiple of said predetermined load, and connections between the bands and the aforesaid device for controlling operation of the latter according to said multiples of load.

31. In a machine including devices to be controlled for operation according to a multi-denominational order load on a weighing mechanism; the combination of selecting elements for the values of one order of such load and extending along and covering a weight range equivalent to a single increment of value in the next higher order of the load, a plurality of selecting members each corresponding to a different value in the higher load order, means controlled by the weighing mechanism according to multiples of the load value increments in the higher order for moving the selecting members in succession, one after another, into and along the range of said selecting elements to select the latter according to the lower order load value in excess of the higher order load value to which the active selecting member corresponds, means controlled by the coaction of the latter member and the elements selected thereby for determining operation of the aforesaid devices according to said lower order load value, and means coacting with the selecting member for determining the operation of the aforesaid devices according to the multiple of the load in the higher order represented by the active selecting member.

32. In a machine having load weighing mechanism; the combination of value exhibiting mechanism, load translating means settable under control of the weighing mechanism according to different load values, operating means for differentially operating the exhibiting mechanism in accordance with the load setting of the translating means and under control of the latter means, a manual device movable by the operator to an active position for rendering the operating means effective to differentially actuate the exhibiting mechanism, and means for preventing repeat operation of the exhibiting mechanism by the operating means under control of the translating means upon retention by the operator of the manual device in its active position.

33. In a machine having load weighing mechanisms; the combination of value exhibiting mechanism, load translating means settable under control of the weighing mechanism according to different load values, means for operating the exhibiting mechanism under control of the translating means, a device manually movable at will to an active position for rendering the operating means effective to differentially operate the exhibiting mechanism, a latch for maintaining the device in its active position, means controlled by the operating means after its operation of the exhibiting mechanism for releasing the latch from said device, and means thereupon effective for restoring the device to inactive position.

EDWARD J. VON PEIN.